United States Patent
Wolff et al.

(10) Patent No.: US 6,604,064 B1
(45) Date of Patent: Aug. 5, 2003

(54) MOVING WEAPONS PLATFORM SIMULATION SYSTEM AND TRAINING METHOD

(75) Inventors: Ronald S. Wolff, Merritt Island, FL (US); Edward J. Purvis, Orlando, FL (US); Robert T. McCormack, Oviedo, FL (US); Paul G. Barber, Orlando, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/459,383

(22) Filed: Nov. 29, 1999

(51) Int. Cl.⁷ ................................. G06G 7/48
(52) U.S. Cl. .................... 703/7; 703/6; 703/8; 434/21; 434/23
(58) Field of Search .............................. 434/22, 21, 33, 434/23; 89/41.19; 703/6, 7, 8; 235/404; 318/632

(56) References Cited

U.S. PATENT DOCUMENTS

| | | | | |
|---|---|---|---|---|
| 3,566,743 A | * | 3/1971 | Frihock, Jr. ............... | 89/41.19 |
| 3,840,794 A | * | 10/1974 | Clement et al. ............ | 318/632 |
| 4,004,729 A | * | 1/1977 | Rawicz et al. ............. | 235/404 |
| 4,561,849 A | * | 12/1985 | Eichweber .................. | 434/22 |
| 4,680,012 A | * | 7/1987 | Morley et al. .............. | 434/22 |
| 4,804,325 A | * | 2/1989 | Willits et al. ............. | 434/22 |
| 4,959,016 A | * | 9/1990 | Lawrence ................... | 434/22 |
| 5,035,622 A | * | 7/1991 | Marshall et al. ............ | 434/23 |
| 5,194,908 A | * | 3/1993 | Lougheed et al. ........... | 356/28 |
| 5,215,465 A | * | 6/1993 | Marshall et al. ............ | 434/22 |
| 5,382,026 A | * | 1/1995 | Harvard et al. .............. | 463/5 |
| 5,453,011 A | * | 9/1995 | Feuer et al. ................ | 434/38 |
| 5,641,288 A | * | 6/1997 | Zaenglein, Jr. .............. | 434/21 |
| 5,945,625 A | * | 8/1999 | Zielinski ................... | 89/36.13 |
| 5,951,404 A | * | 9/1999 | Oishi et al. ................ | 472/60 |
| 5,974,940 A | * | 11/1999 | Madni et al. ............... | 89/41.17 |
| 6,125,308 A | * | 9/2000 | Hills et al. ................ | 70/1 |
| 6,199,000 B1 | * | 3/2001 | Keller et al. ............... | 701/50 |
| 6,283,757 B1 | * | 9/2001 | Meghnot et al. ............. | 434/33 |
| 6,292,215 B1 | * | 9/2001 | Vincent ..................... | 348/169 |

OTHER PUBLICATIONS

US Army Operational Test and Evaluation Command, "Close Combat Tactical Trainer Critical Technical Parameters Report", Jul. 1998.*

* cited by examiner

Primary Examiner—Samuel Broda
Assistant Examiner—Kandasamy Thangavelu
(74) Attorney, Agent, or Firm—Mark O. Glut; John D. Lewis

(57) ABSTRACT

A simulation system for operation of simulated weapons on moving vehicles includes a platform for supporting a trainee and an actuator operable with the platform for providing pitch and roll movement to the platform in conformance with pre-recorded live movements. A demilitarized weapon is operated from the platform with the weapon providing a weapon triggering signal to a system computer. A pulsed laser light source is attached to the barrel of the weapon for emitting a beam and placing an infrared spot onto a video projection screen which displays a recorded scene provided by a video projector. A spot tracker continuously tracks the spot as the trainee aims the weapon toward selected targets within the scene, and provides coordinate location data representative of spot locations on the screen. The computer operates the actuator for controlling the pitch and roll movement of the platform in response to a pre-processed movement profile, and receives signals from the spot tracker for receiving the coordinate location data during weapon movement and firing for providing target strike performance measurements based on the aiming and firing of the weapon. Software used by the computer includes ballistic models for providing an added realism to the weapon selected for the training.

2 Claims, 9 Drawing Sheets

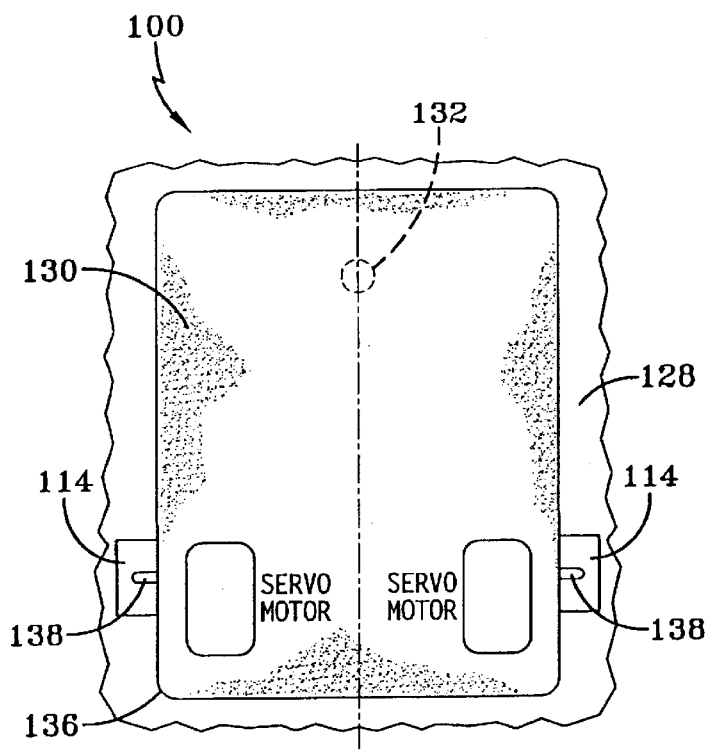
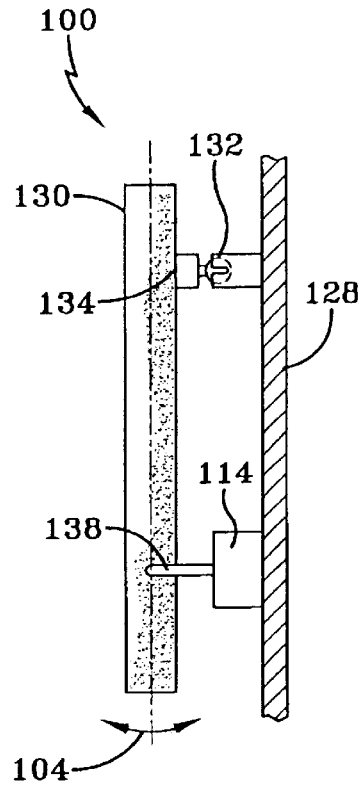
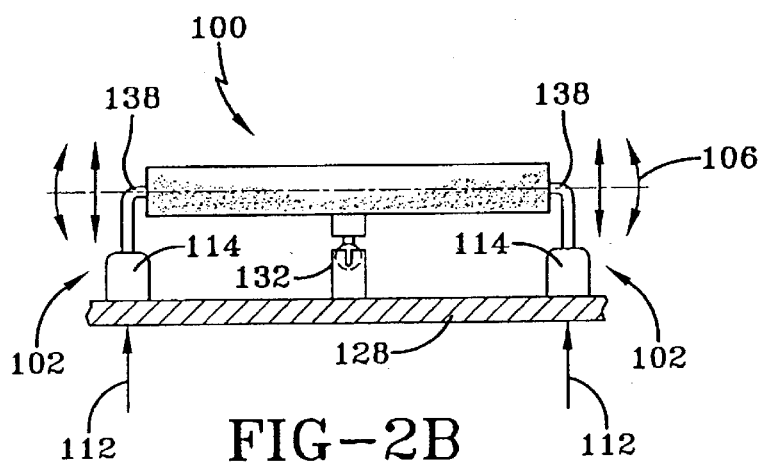
FIG-2A
FIG-2C
FIG-2B

WHERE

| | | | |
|---|---|---|---|
| $V_p$ | POSITION VOLTAGE | $\omega$ | ANGULAR VELOCITY |
| $K_A$ | CURRENT GAIN CONSTANT | $\Phi$ | ANGULAR POSITION |
| $K_T$ | MOTOR TORQUE CONSTANT | $P_g$ | POSITION GAIN |
| $1/J$ | TOTAL INERTIA | $V_g$ | VELOCITY GAIN |
| $K_v$ | TACHOMETER GAIN | $T_v$ | TACHOMETER GAIN |
| $K_p$ | POTENTIOMETER GAIN | $I$ | SERVO CURRENT |

MOVING WEAPONS PLATFORM SIMULATION SYSTEM AND TRAINING METHOD

FIELD OF THE INVENTION

The present invention relates to simulators useful in training direct fire weapons, and in particular to the simulation of moving platforms from which personnel will operate such weapons.

BACKGROUND OF THE INVENTION

There is a need for training with moving weapon platforms such as small patrol boats and land based vehicles employing direct-fire weapons. Motion based training for gunners should preferably include realism, frequency of use, and feedback for measuring performance. Marksmanship skills can degrade quickly without reinforcement. Direct-fire weapons training, utilizing moving platforms, is typically safety regulated, costly and lacking in desired performance measurements. In addition, where training is available, live-fire feedback and scoring results provided to the trainee are minimal and in many cases non-existent due to the inherent dangers of live-fire training. Performance measures such as reaction time, weapon tracking, and target identification skills are difficult to obtain and the threat of the aggressor is non-existent. Improving the quality and amount of training for weapon delivery is a critical component in force readiness. Simulation provides a cost effective means of teaching initial weapon handling skills and providing training in areas that live fire cannot address due to safety or other restrictions.

The ever increasing threat of close quarter conflict by both terrorist and militant groups has increased the demand for direct-fire weapons training more than ever. Live-fire training ranges are insufficient, and training ammunition is expensive and dangerous. Moving weapon platforms, including small patrol boats and land based vehicles, employing direct-fire weapons such as the M2 0.50 caliber machine gun and the MK-19 40 mm machine gun are especially in need of motion-based simulation technology. Direct-fire training and simulation utilizing moving platforms is currently either cost prohibitive or deficient.

SUMMARY OF THE INVENTION

In view of the foregoing background, it is therefore an object of the present invention to simulate the firing of direct-fire weapons from a moving platform at moving and stationary targets. In addition, it is an object to provide subject matter for expert testing and simulation training effectiveness using motion for direct-fire weapons training provided by a two axis motion platform that addresses the training needs of direct fire weapon training with motion. It is further an object of the present invention to reduce components and processing typically used in simulation, thus encouraging use and reducing costs.

These and other objects, advantages and features of the present invention are provided by a simulation system useful in training for operation of weapons on moving vehicles. The simulation system comprises a platform for supporting a person to be trained and actuator means operable with the platform for providing pitch and roll movement to the platform in conformance with desired preselected movements. A demilitarized weapon is operated by the person while positioned on the moving platform with the weapon providing a triggering signal responsive to a firing action of the weapon. A light source is carried by the weapon for emitting a beam therefrom and placing a spot onto a surface indicative of a barrel position of the weapon. A two dimensional surface of a projection screen provides an effective low cost and simple surface. A spot tracker continuously tracks the spot as an image is placed on the surface by a video projector, and provides coordinate location data representative of spot locations on the surface. In one preferred embodiment, a pulsed laser is used to provide a uniform infrared spot on the screen. A computer operates with the actuator means for controlling the pitch and roll movement of the platform in response to a pre-processed movement profile, and operates with the spot tracker for receiving the coordinate location data during weapon movement and firing, wherein the triggering signal and tracking provide information to the computer for determining target strike performance of the person being trained.

A method aspect of the invention includes steps in training a gunner, the person operating a weapon from the platform, while the platform experiences pitching and rolling movement. The method comprises the steps of placing the gunner on the platform for operating the demilitarized weapon. The light source is attached to the weapon for emitting an infrared beam along a line-of-sight of the gunner. A scene is displayed on a fixed screen for viewing by the gunner. The eye of the gunner is arranged to be at an elevation of a horizon in the scene, and a preselected target is positioned below the horizon within the scene. Pitching and rolling movement is imparted to the platform in response to a preselected motion profile synchronized with the scene. The weapon is aimed at the screen for placing an infrared spot thereon, which is continuously tracked. Triggering the weapon initiates simulation of a projectile from the weapon. A location of the spot at the triggering is identified and a ballistic correction is made for determining gunner performance.

The simulation system of the present invention, a moving weapons platform simulator, allows for the simulation of direct-fire weapons from a low-cost, two-axis electric motion platform and provides a testing environment in which to measure the training effectiveness of using motion as a means of advanced training in direct-fire weapon systems from moving vehicles. Performance variables such as continuous tracking error, hit percentage, time to engage targets, and time to first hit on target are collected in real time to aid in the analysis of within-simulator training effectiveness studies. Objectives include providing a system at a low-cost, as earlier described, a PC-based system computer; and provision for real time land and water scenarios, by way of example. Further objects include providing for vehicle motion recording and synchronization using a low-maintenance motion platform which can be used in a typical classroom. Continuous weapon tracking, inclusion of ballistic models, simulated weapon recoil and weapon sound effects, and an effective collecting and evaluation of data are provided by the system of the present invention.

In order to provide sufficient realism and data collection for analysis, system components included a two axis motion platform, a realistic weapon interface, continuous weapon tracking, synchronization of motion to video, weapon recoil, tracer effects, impact effects, trigger pull, weapon zeroing, and land/water scenarios.

The simulation system fits into a standard classroom environment while minimizing logistics, maintenance, and safety requirements. A PC-based system computer controls the system real-time. The system computer directly controls the video projection system, the video scenario playback system, the electric motion platform, the simulated weapon and effects, the continuous weapon tracking system, and the digital sound system.

Prerecorded video scenarios consisting of both water and land based threats are stored on optical disks and displayed on a fixed 120-inch diagonal video projection screen. The video scenarios are recorded with a gyro-stabilized camera and an electronically stabilized lens system to reduce the video motion in both pitch and roll. Pitch and roll motion data from the moving vehicle is recorded synchronously with the live video. Although only two axis of motion are directly recorded during video taping, the third axis of motion (heave) is simulated indirectly by allowing the video to shift vertically upward and downward during recording. During the taping of the video scenarios, the video is stabilized for both pitch and roll while heave is allowed. In this manner, the motion platform provides the human sensory motion cues for pitch and roll while the vertical video shift provides for the visual sensory motion cue for heave.

In an embodiment herein described by way of example, a video projection screen is fixed in location approximately 20 feet in front of the gunner. The gunner engages video and graphic targets from the motion platform using a demilitarized M2 0.50 caliber machine gun. Weapon recoil, trigger, tracers, ballistics, explosions, and sound effects are all simulated to the subject during a scenario. In addition, the system computer collects the continuous real time performance data for feedback and analysis that includes continuous weapon tracking; tracking variance relative to target; hit and miss percentage; time to engage target; time to first hit on target; and number of rounds fired.

BRIEF DESCRIPTION OF THE DRAWINGS

A preferred embodiment of the invention, as well as alternate embodiments are described by way of example with reference to the accompanying drawings in which:

FIGS. 2A, 2B, and 2C are partial top plan, front elevation, and side elevation views of a motion platform used in the system of FIG. 1;

DETAILED DESCRIPTION OF PREFERRED EMBODIMENTS

Figure 1:
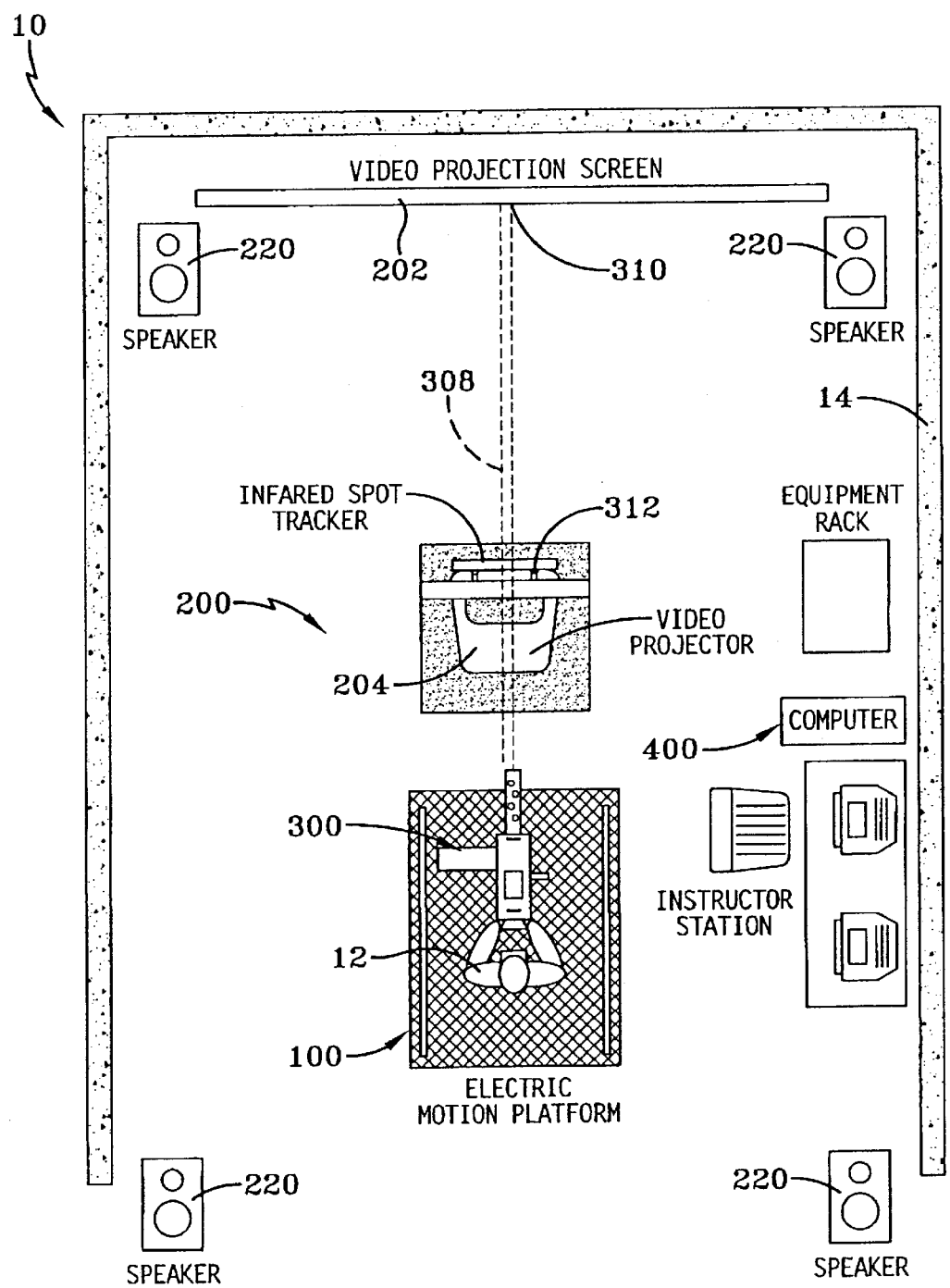
FIG. 1 is a partial plan view of a simulator system of the present invention.
Figure 3:
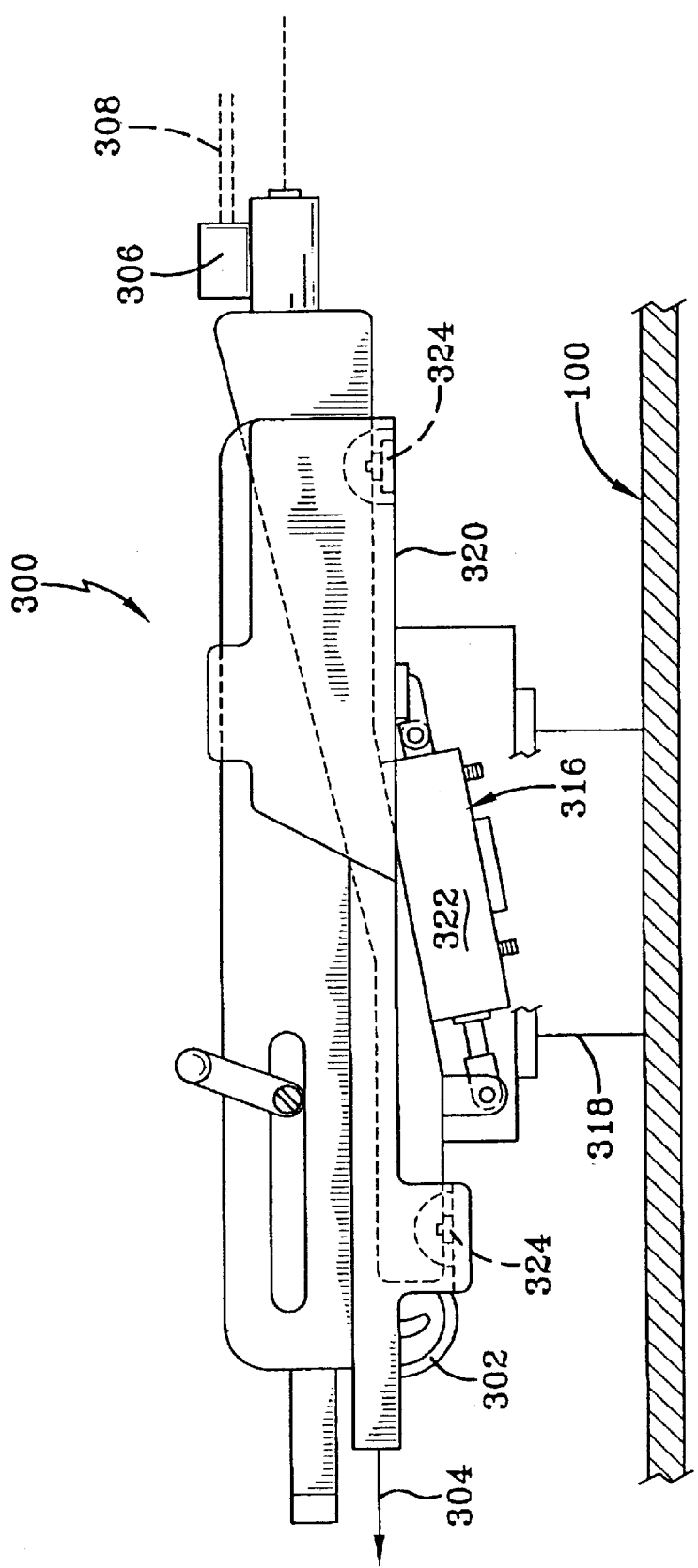
FIG. 3 is a partial side view illustrating a weapon selected for use in the system of FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As illustrated with reference initially to FIGS. 1, 2A–2C, 3, and 4, one preferred embodiment of the present invention, a simulation system 10 comprises a platform 100 for supporting a person/gunner 12 to be trained. Actuator means 102 are operable with the platform 100 for providing a pitching movement 104 and a rolling movement 106 to the platform. A video display portion 200 of the system 10 includes a video projection screen 202 positioned in a fixed orientation for viewing from the platform 100. A video projector 204 is provided for projecting video images onto the screen 202. A demilitarized weapon 300 is manually operable by the gunner 12 who pulls a trigger 302 for providing a triggering signal 304 responsive to a firing action of the weapon 300. In the embodiment herein described, an optical video player 206 provides a video source for storing a prerecorded video image. A light source 306 is carried by the weapon 300 for emitting an infrared beam 308 therefrom and placing a uniform spot 310 onto the video projection screen 202 indicative of a barrel position of the weapon. An infrared spot tracker 312 continuously tracks the infrared spot 310 as it moves along the viewing surface of the screen 202 and provides coordinate location data through a location data signal 314 output from the tracker representative of spot locations on the video screen. A system computer 400 is operable with the actuator means 102 which includes a platform controller 108 for controlling the pitching and rolling movement 104, 106 of the platform 100 in response to a pre-processed movement profile. The computer 400 is further operable with the spot tracker 312 for receiving the coordinate location signal 314 representative of the collected location data and with the weapon 300 for receiving the triggering signal 304 therefrom and providing a time stamp to the tracked data for determining target strike performance for a preselected target. The target strike performance goes beyond supplying only hit or miss results and provides angular errors for a missed hit. The computer 400 yet further operates with the video projector 204 and the video player 206 for controlling operation thereof to thus provide a preselected scenario for training the gunner 12. Details for elements of the system 10 and its operation follow.

As illustrated with reference again to FIG. 1, the system 10 fits into a standard classroom 14 while minimizing logistics, maintenance, and safety requirements.

Figure 4:
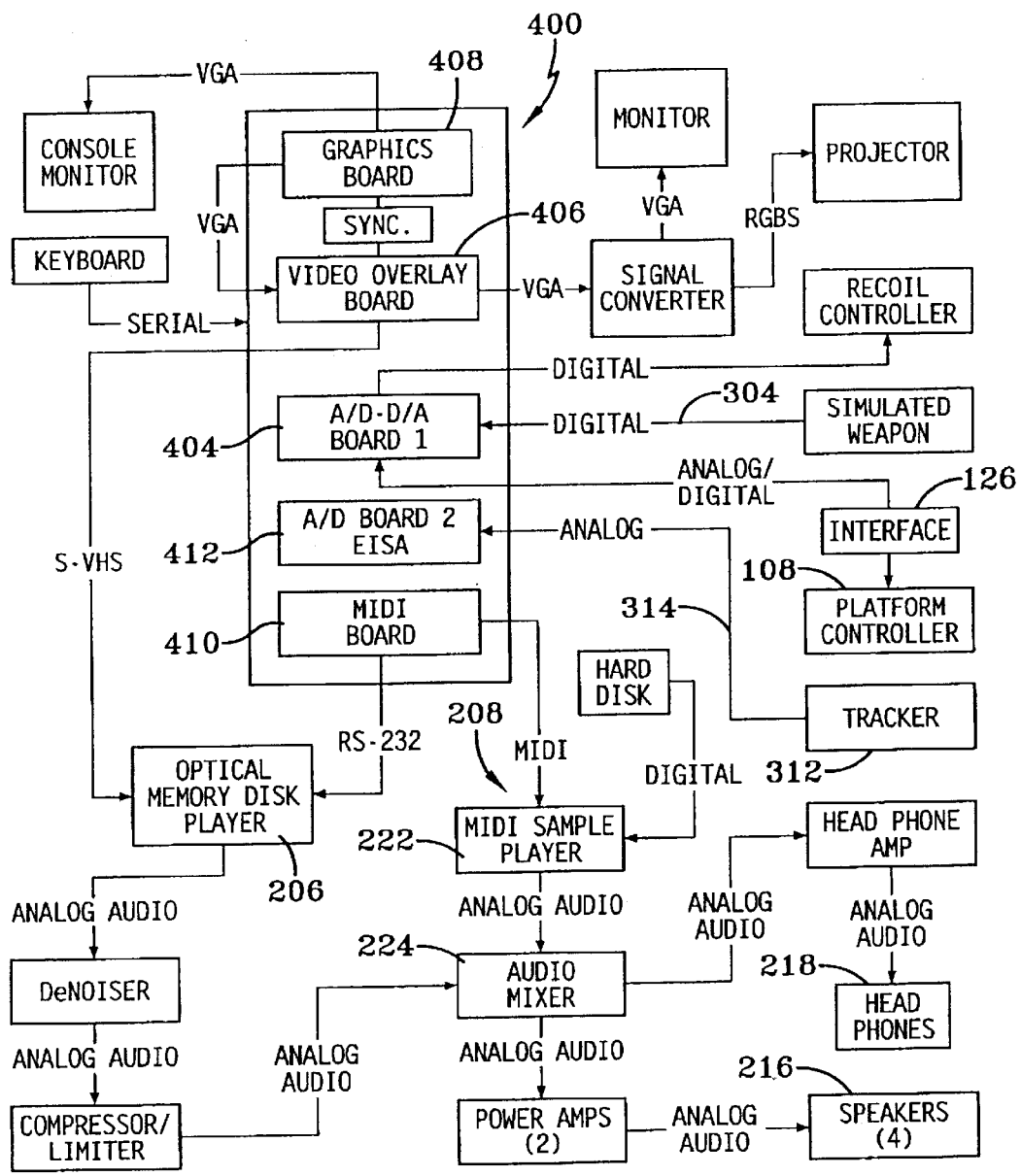
FIG. 4 is a block diagram illustrating a system integration of elements used in the system of FIG. 1.
Figure 5:
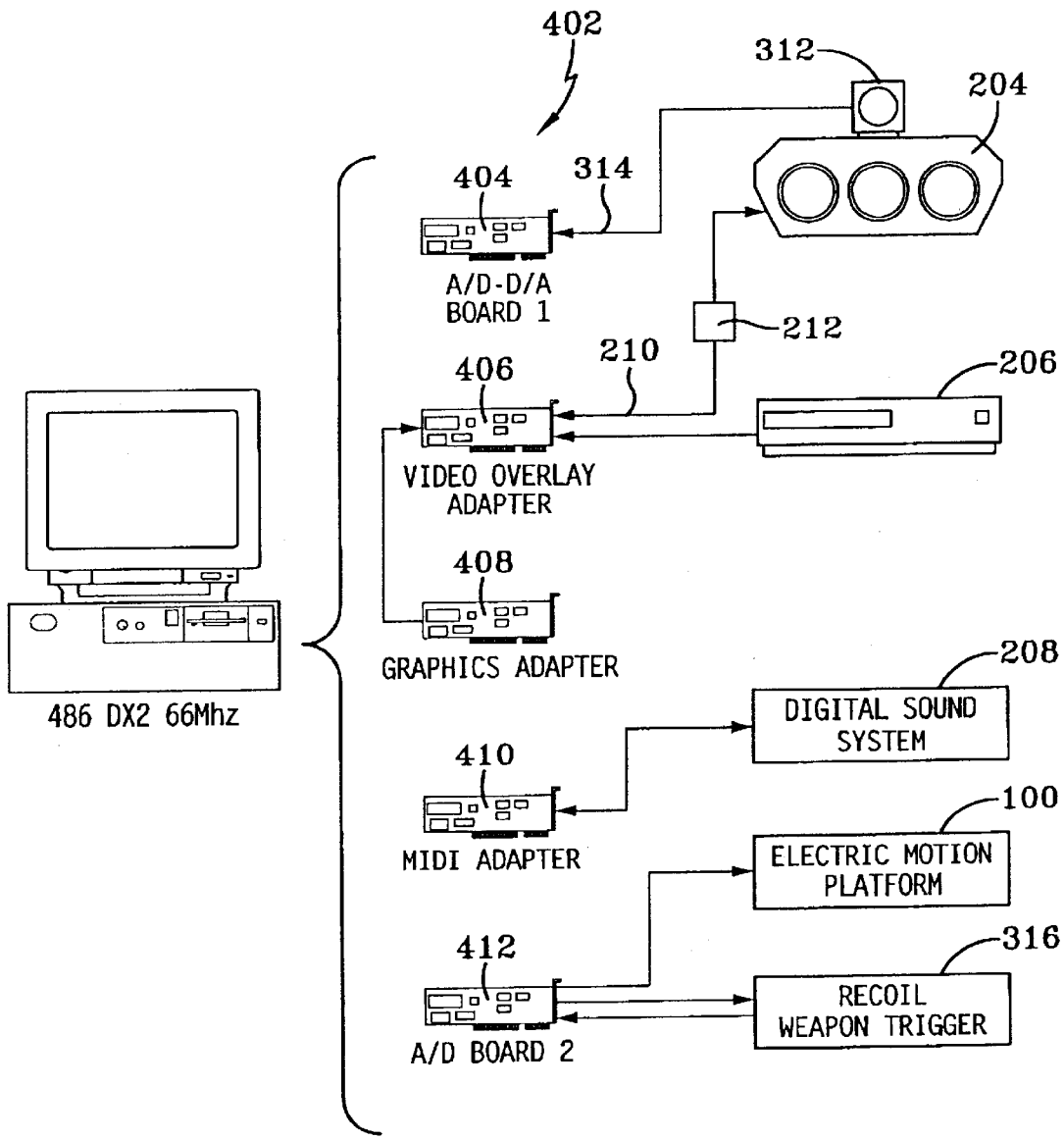
FIG. 5 is a block diagram illustrating system and computer components for the system of FIG. 1.

The computer 400 in one embodiment of the system 10, herein described by way of example, includes a 486 DX2 66 MHz PC-based system computer for controlling operation of the system 10 in real time through five interface boards 402 identified as an A/D-D/A board 404, video overlay adapter board 406, graphics adapter board 408, musical instrument digital interface, MIDI adapter board 410, and an A/D board 412 as illustrated with reference again to FIG. 4, and to FIG. 5. The system computer 400 directly controls video projection using the video display portion 200 of the simulation system 10, the platform 100, an electric motion platform, the simulated weapon 300 and special effects, the continuous weapon tracking through the tracker 312, and a digital sound system 208.

The video display portion 200 of the system provides for presentation of prerecorded video scenarios and various real-time graphical special effects shown to the subject during training. As illustrated with reference again to FIG. 5, component integration of the video display portion 200 includes a video output signal from the optical disk player 206, which output signal is processed by two video/graphic processing boards, passed through a video signal converter 212, and output to the CRT-based video/graphics projector 204. Special effects such as tracers, impacts, explosions, and tracking feedback are also displayed to the gunner 12 during training.

The video/graphics computer hardware consists of the two PC-mounted interface boards 402, including the Matrox MGA Impression board 408 and the Matrox Marvel board 406 which boards communicate with each other through a standard VGA feature connector. The purpose of the two board set in the MWEPS configuration is to allow for graphics overlay on video during and after a training scenario and to generate simple graphic scenarios. This allows for special effects such as tracers, explosions (hits), and impacts (misses) to be viewed during the video scenario.

The Matrox MGA Impression board 406 is a Video Electronics Standards Association (VESA) Local Bus Super Video Graphics Adapter (SVGA) graphics card with a 3-D graphics accelerator on board. The Matrox MGA Impression board 408 has 3 megabytes of video memory. In the system 10, the VGA mode of the board is disabled. The MGA Impression graphics board is the secondary graphics card. The graphics board is controlled by the MWEPS software using standard library calls supplied by Matrox. The MGA Impression board supports resolutions up to 1600×1200 pixels. However, in the MWEPS testbed the MGA board is in the 640×480 mode at 24 bits per pixel (16 million colors). This is done for two reasons. First, the video signal being grabbed by the Marvel board is in 640×480 resolution. Secondly, the 640×480 mode allows for two graphics pages in memory for doing ping-pong graphics for animation while still providing some off-screen memory for storing the bit-map images used for special effects (e.g., explosions). The VGA graphics output of the MGA Impression board is fed into the VGA input of the Marvel board.

The Matrox Marvel board 406 occupies one ISA slot. It has one VGA input and two video inputs supporting composite video and s-video. It has one VGA output. The Marvel board digitizes incoming video and reconstitutes it to the VGA output. It can perform many functions on the video. The primary function used in the MWEPS system is to overlay (chroma-key) the graphics from an off-board VGA board (the MGA in this case) on a pixel-by-pixel basis. Chroma-keying is the process of defining one or more colors from the VGA card to be interpreted by the Marvel board to be video. Any pixel that is this color will be replaced with the corresponding video pixel. Any other color is passed unchanged to the output. Using this feature, the background color of the MGA board is set to video. This allows graphics to be overlaid on the video in real-time.

Figure 6:
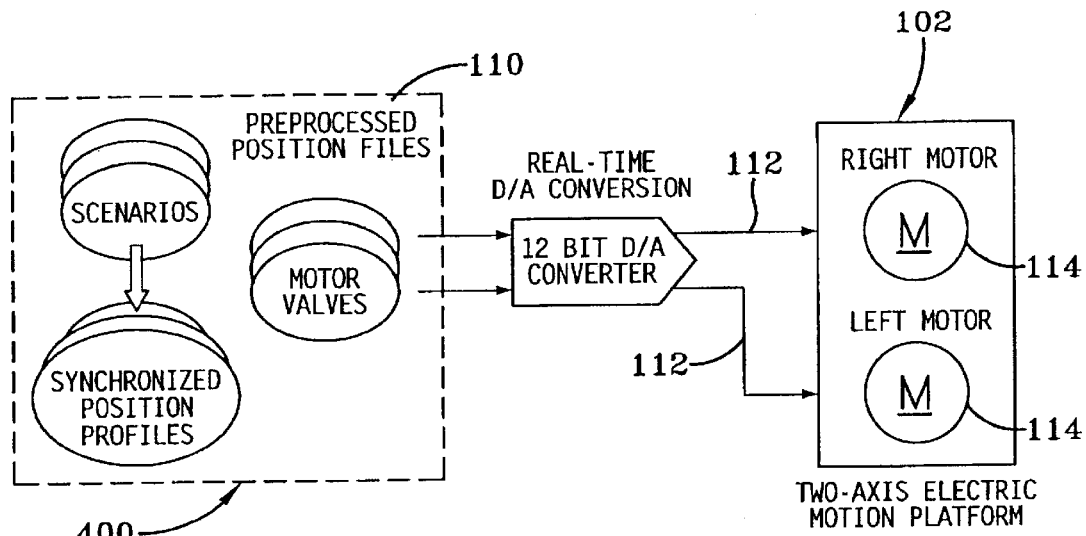
FIG. 6 is a partial block diagram illustrating pre-processed position files operable with the platform of FIG. 1.

With reference again to FIGS. 2A–2C, one preferred embodiment of the platform 100 comprises a Servos and Simulation Model 700-2 two-axis electric motion platform. This motion platform 100 has approximately +/−15 degrees of motion in both pitch 104 and roll 106 while supporting up to 2000 pounds of payload. In addition, the footprint of the motion platform 100 allows for the installation in the standard classroom 14, as earlier described with reference to FIG. 1. The motion platform 100 provides full motion in both pitch 104 and roll 106 during video and graphic scenario playback to the gunner 12. The motion platform 100 position is controlled by pre-processed position profiles 110 available to the computer 400, as illustrated with reference to FIG. 6. Each video or graphic scenario has a synchronized position profile. A computer program pre-processes the position profile data associated with each scenario on a frame by frame basis. The subsequent position profiles for both pitch 104 and roll 106 are converted to digital motor values by the system computer 400 and stored in computer memory. The motor values are then converted to analog voltage signals 112 (+/−10 vdc), in synchronization with the video scenario playback, to drive the electric motion platform DC motors 114 to provide the pitch 104 and roll 106 movement to the platform 100.

The motion platform 100 provides the gunner 12 with a continuous dynamic motion as would be experienced in the real world environment. This can be accomplished by a combination of visual and motion stimuli which generate inputs into the human physiological system. To ensure that the human sensory system receives coherent motion information, the visual scene, as seen by the user on the screen 202, earlier described with reference to FIG. 1, is synchronized to the motion of a simulated vehicle. This is true regardless of the complexity or dynamics of the motion platform. Motion platform systems can use either graphics or video for their visual display. However, in each case, the simulator system should correlate the movement of the motion platform to each frame of corresponding video or graphics.

For the system 10, herein described by way of example, real time motion dynamics data is applied from a live-motion system to the simulated motion system 10. Complexities such as wash-out during motion simulation were not addressed since the limited dynamic range of the actual live vehicle for testing and training was well within the dynamic range of the selected motion platform. When using live video to generate the scenarios, as opposed to graphics, the motion of the moving vehicle is used as the reference data input for controlling the motion platform 100.

Figure 7:
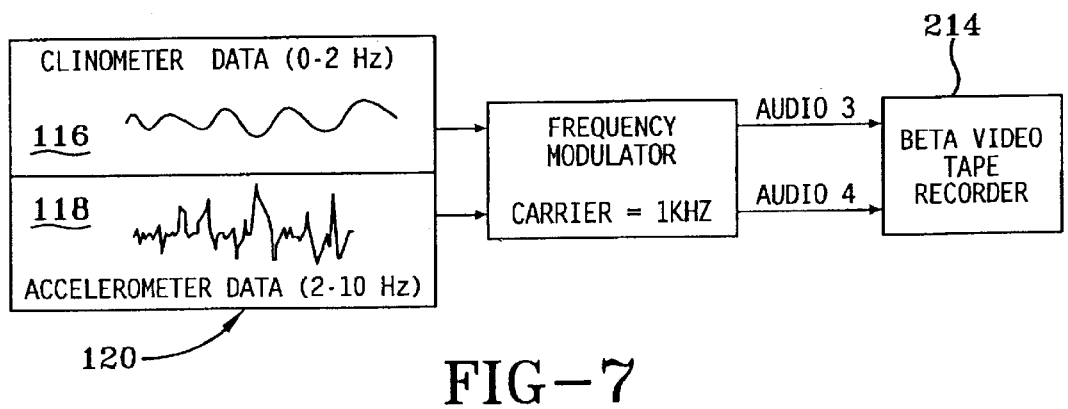
FIG. 7 is a block diagram illustrating a motion capturing system of the present invention.

As illustrated with reference to FIG. 7, the system 10, collects and stores real time motion data recorded by using clinometers 116 and accelerometers 118 attached to a vehicle 120, such as a vessel, during live video taping. Clinometers are used to measure low frequency motion responses, while accelerometers are used to measure high frequency motion responses. The motion data collected during video taping is used to frequency modulate a 1 kHz carrier. This allows the low frequency motion data to be stored within the limited bandwidth of the professional Beta video tape on a recorder 214. By way of example, the analog motion data captured during live exercises is stored on audio channels three and four, while audio channels one and two are used for normal audio effects such as engine and road noise. In this manner, the live motion data is directly correlated on a frame by frame basis to the live video during recording. Subsequently, during playback, it is a simple matter to decode the frequency modulated analog motion data from the audio channels to control the pitch 104 and roll 106 of the simulator motion platform 100, earlier described.

Integration of the weapon 300 and the tracker 312 provides a method in which to track the continuous aim point of the weapon, provide realistic recoil, and provide a correct sight picture to the gunner 12. By way of example, a soft-mount M2 0.50 caliber machine gun was selected as the direct-fire weapon 300 to integrate into the system 10. A demilitarized M2 0.50 caliber machine gun was instrumented with a pneumatic recoil device 316 illustrated with reference again to FIG. 3, the electronic trigger 302, and a to collimated high-power infrared emitting diode for the light source 306 for weapon aim point detection. The M2 0.50 caliber machine gun is mounted on a standard pedestal mount 318 which is attached to the platform 100.

Weapon recoil is provided by moving the weapon forward and backwards within a weapon cradle 320 at a rate of approximately 10 Hz. A single two-inch air cylinder 322 is pivotally attached between the cradle 320 and the weapon 300. The air cylinder 322 is operated at 110 psi and provides approximately 300 pounds of force to overcome static friction and compressed soft-mount hydraulic shock absorbers 324, which can be located at various positions on the weapon/cradle. The soft-mount hydraulic shock absorbers return the weapon to its original state just prior to a new cycle. The hydraulic recoil device 316 reproduces the displacement distance and frequency observed on a live-fire M2 0.50 caliber machine gun using a soft-mount. The recoil air cylinder 322 is mounted to the hard-frame gun mount with a trunnion plate and pin attachment. It is understood that various mounting techniques may be included without departing from the intent and teachings of the present invention. By way of example, a clevis bracket and pin attaches the actuating shaft of the pneumatic cylinder to a movable gun mount. The movable gun mount slides on four nylon disks allowing the gun cradle to slide within the hard-frame gun mount during actuation of the recoil air cylinder.

The aiming of the weapon 300 by the gunner 12 is continuously tracked for providing continuous weapon aim position information to the system computer 400. Weapon tracking is performed with the spot tracker 312, a high-speed infrared (IR) spot tracker developed by Naval Air Warfare Center Training Systems Division (NAWCTSD, Marshall 1993). The infrared spot tracker 312 provides high-speed position coordinates of where the weapon is pointed with increased speed, resolution, and accuracy.

Figure 8:
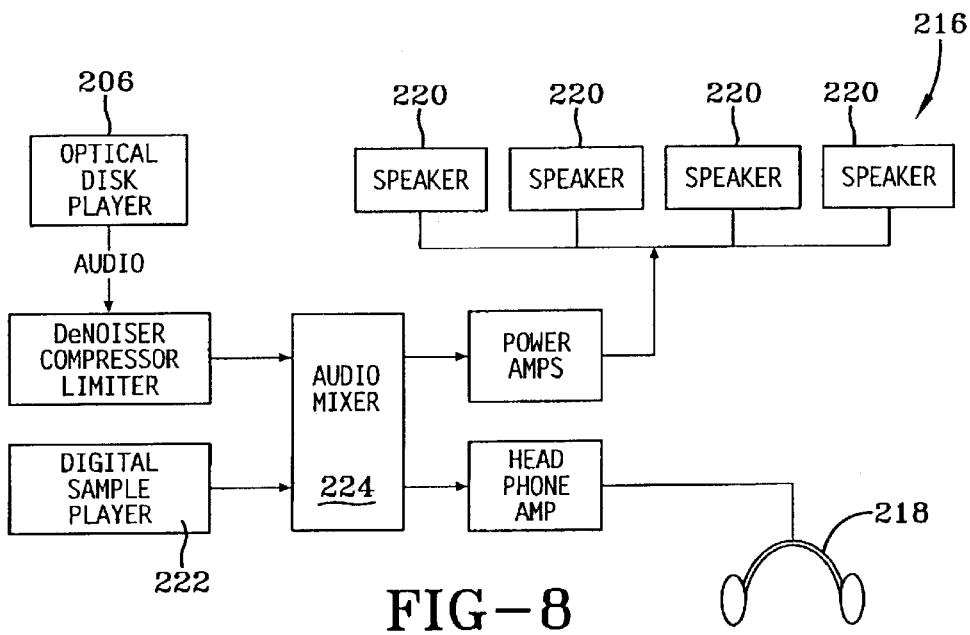
FIG. 8 is a block diagram illustrating a sound system useful in the simulation system of FIG. 1.

The digital sound system 208, as illustrated with reference to FIG. 8 and again to FIG. 1, provides simulated sound effects for weapon fire, round impacts, explosions, and voice commands. Sound volume and time delay are calculated by the system computer 400 to take into account sound effects at various ranges. Sound is provided to the subject by speakers 216 from either headphones 218 or external speakers 220 at a sound level representative of what the gunner 12 would hear with hearing protection during live firing. The sound effects presented to the gunner 12 come from two audio sources. One source of audio is from the video tape/optical disk 206 in which the video scenarios are prerecorded. By way of example, these sounds include engine audio recorded from the moving platform during scenario recording. A second source of audio is from a Roland SP-700 digital sample player 222, as illustrated with reference again to FIG. 4. The digital sample player 222 is controlled by MIDI signals generated by a MIDI controller board 410 located in the system computer 400. Through MIDI controls, the system computer 400 can access prerecorded digital sound effects from the digital sample player 222. By way of example, sound effects may include voice commands, explosions, impact effects, and weapon sounds. An analog mixer 224 combines sounds from the digital sample player 222 with the engine sounds from the optical disk 206, by way of example.

In one preferred embodiment of the operation of the system 10, scenarios are based on live video recordings but can include digitally created graphical scenes without departing from the teachings of the present invention. By using video technology as opposed to computer graphics computational overhead requirements on the system computer are significantly reduced. Further, by reducing system computer requirements, the overall cost of the system 10 is significantly reduced. Yet further, video scenarios provide realistic targets and terrain features including contrast and lighting effects.

In choosing to use video scenarios as the primary method in which to display the visual scenarios to the gunner, certain procedures will be applicable. By way of example, scenarios will be provided by an available video scenario library with additional training scenarios produced in their entirety. Post-processing of the video scenarios will generally be needed for use with the system 10 as will be further detailed later in this section. Video scenarios are inherently two-dimensional, and as a result, it is preferable to account for ranging information, ballistics, target hits, and round impacts. However, it has been found that for the current application of direct-fire weapon simulation systems, a significant cost reduction is realized, and thus video scenarios present an attractive cost-effective and realistic means in which to provide a trainer to meet the immediate needs of a fleet.

The scenarios presented to the gunner during testing provide realistic threats as would be encountered in the real world. In addition, the video scenarios are manageable by the system computer 400 through scenario control files such that data collection of various performance measures can be performed. The following scenario requirements have been identified, by way of example, as one set of requirements for a successful creation of training scenarios, and include establishing camera geometry to match a desired system configuration, producing high resolution video with good lighting, stabilizing video in both pitch and roll, providing generally level terrain, providing a relatively constant field of view (avoiding panning), providing a constant distant terrain feature, and synchronizing the motion to video during video taping.

The scenario development process includes various steps to transition from the field video tapes to the video disk-based scenarios presented to the subject. By way of example, a script is generated which completely describes the aggressor actions based on subject matter expert input. Next, the scenarios are video taped and video segments are selected and transferred to edited master tapes. The edited master tapes are then transferred to video disk. The video segments are further processed off-line at a computer workstation to generate various scenario control files.

In one preferred embodiment of the present invention, a video scenario is defined by a series of seven scenario control files. Scenario control files are used by the system computer to manage the video scenarios. In addition, the scenario control files allow the system computer 400 to correlate two dimensional weapon aim point positions to the video scenario scene to determine hits, misses, and the location of various special effects such as explosions, tracers, and round impacts.

By way of further example, scenario controls files include:
Target Outline File (*.CLP) which contains polygon outlines for each target in each frame of video. The file is created off-line using a utility program called Mapmenu.exe;

Background File (*.BGD) which contains polygon outlines of the areas of the background in which impact effects are allowed to be displayed during a scenario. The file is created off-line using a utility program called Mapmenu.exe;

Terrain Constant File (*.TRN) which contains two-dimensional position coordinates of a distant terrain feature marked in each frame of video to allow the graphic overlay effects to be shifted in synchronization with the video motion during video playback. The file is created off-line using a utility program called Mapmenu.exe;

Horizon File (*.HRZ) which contains two-dimensional position coordinates of an arbitrary horizon point on a frame by frame basis or simply as a constant offset from the terrain constant point created in the terrain constant file. The file is created off-line using a utility program called Mapmenu.exe;

Position File (*.PSN) which contains digitized motor position data for both pitch and roll. This file is created off-line by reading prerecorded accelerometer and/or clinometer data directly from the video tape audio tracks on a frame by frame basis. The accelerometer data is then converted to motor position values. Each motor position value corresponds to an equivalent video frame;

Sound File (*.SND) which contains sound handles and their corresponding frame numbers for audio playback during a scenario. This file is created off-line with a text editor; and Shootback File (*.SHB) which contains aggressor shootback data for each frame of video. This file is created off-line using a utility program called Mapmenu.exe.

The video techniques and problems encountered during the filming of the scenarios are typical of any video production effort. However, in addition to what is considered normal video techniques and problems, additional matters are recommended for consideration. These include, by way of example:

Resolution: The system 10, as herein described, uses the optical video disk player 206, earlier described with reference to FIGS. 4 and 5, as a way to store and play back video scenarios to the subject. The optical video disk player is limited to approximately 400 lines of horizontal resolution. This limits target ranges to approximately 800meters for typical direct-fire target engagements. To ensure maximum video quality, it is recommended that video taping be done with a professional broadcast Beta camera. This will allow for video editing and transfer to the optical disk with minimal signal loss.

Lighting: It is further recommended that video taping be done on partly cloudy days with minimal haze in order to maximize contrast and resolution. Video filters can provide for desirable optimal results, especially on bright sunny days or hazy days. Good lighting techniques will allow for maximum resolution and contrast of targets out to their full range.

Terrain: It is further recommended that target terrain selected for video taping be fairly level with minimal obstructions between the target and the camera. A distant terrain feature should be present in the scenario at all times. The distant terrain feature is used as a constant reference point during video processing.

Video Stabilization: For an improved motion-to-video synchronization, a method to stabilize the video camera in both pitch and roll can be used. In one preferred embodiment, a hand held gyro-stabilized camera with an electronically stabilized lens to remove vibrations was used. Camera movement in heave is acceptable since there is no platform motion in this axis. Simulated heave is presented to the subject as a combination of pitch, roll, and allowable video movement in the vertical direction.

Motion Synchronization: Several motion capture techniques were considered for synchronizing the motion of the platform to the video scenarios. Accelerometers were chosen for their resolution and bandwidth. The real time motion data is stored on two of the available four audio tracks on a professional broadcast Beta video recorder deck. This will allow the live motion data to be recorded in synchronization with the live video since the audio channels are inherently synchronized with the video.

The platform 100 of the embodiment herein described, provides a realistic sensory cues such that the gunner 12, the trainees, believes they are experiencing continuous dynamic motion in an infinite environment. The motion platform specifications to meet these requirements are a function of the simulation environment. In this particular application, by way of example, simulation of the firing of direct-fire weapons from a moving platform is provided with sufficient motion dynamics to simulate water and land-based vehicles.

It is to be understood that other options are available to provide motion for a direct-fire weapon simulation system. Two, three, four, and six degrees of freedom motion platforms are readily available with payload capacities ranging from 100 pounds to 40,000 pounds. In addition, there are both hydraulic and electric motion platforms available. Depending on the platform configuration, motion profiles may include two axis pitch and roll; three axis pitch, roll, and heave; four axis pitch, roll, heave, and yaw; and six axis pitch, roll, heave, yaw, x-translation, and y-translation.

There has been a significant increase in the technological development of electric motion platforms suitable for weapon simulation systems. Specifically, high performance brush-less electronic controls have achieved cost, size, reliability, and performance levels that make brush-less electric servo-motors, a cost-effective, practical technology, especially applicable for direct-fire moving weapon simulation systems. The two-axis electric motion platform 100 of the present invention is provided at a low cost when compared to typically available devices, simplifies maintenance and logistics, and allows the system to be used in the classroom. Although only two axis of motion are directly provided for in the selected motion platform, the third axis of motion (heave) can be simulated with a combination of roll, pitch, and vertical video shift. During the filming of the video scenarios, the video is stabilized for both pitch and roll while heave is allowed. In this manner, the motion platform provides the human sensory motion cues for pitch and roll while the vertical video shift combined with the pitch 104 and roll 106, earlier described, provides the sensory motion cues for heave.

Figure 9:
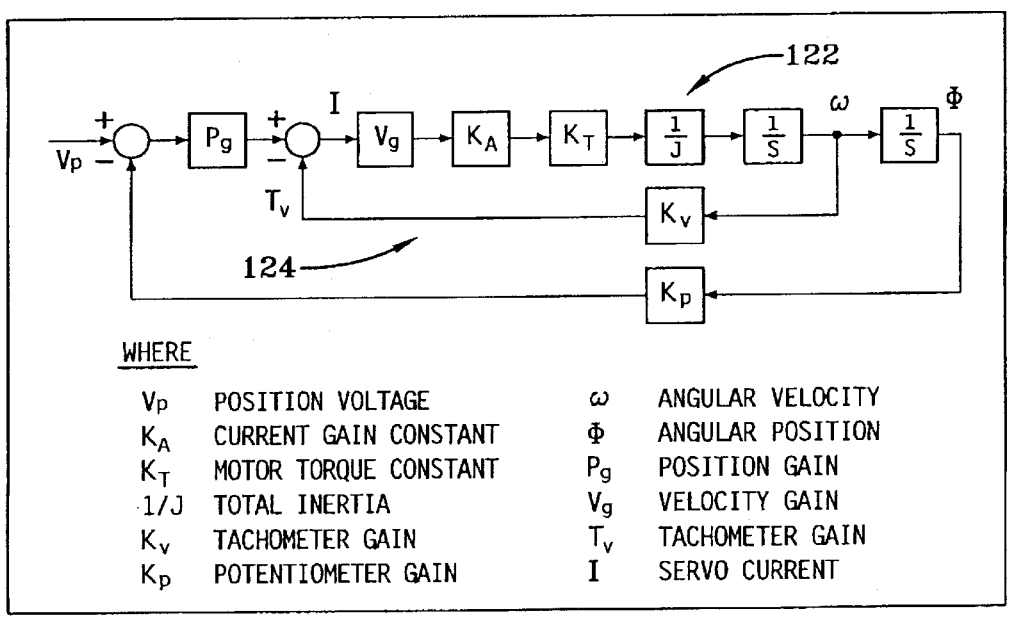
FIG. 9 is a block diagram illustrating a motor control system for the platform movement in the system of FIG. 1.

The Servos and Simulation Model 700-2 electric motion platform 100 is configured as a classical hybrid position control system 122 consisting of two feedback loops as illustrated with reference to FIG. 9. The first feedback loop 124 consists of a tachometer sensor to measure the angular motor speed of each motor 114, illustrated with reference again to FIGS. 2A–2C and 6. This loop provides for increased stability and faster response. The tachometer voltage ($T_v$) is fed back and subtracted from the position voltage ($V_p$). The difference in voltage is multiplied by the current gain ($K_A$) to produce the current (I) which is applied to the DC SERVO motors. The second feedback loop consists of a potentiometer sensor to measure the angular position of each motor shaft. The angular shaft position is fed back and subtracted from the position voltage $V_p$.

Power amplifiers for the electric motion platform receive analog position command signals (+/−10 vdc) from the system computer 400 (D/A board) and amplify them to the required level of current to drive the high torque DC motors, as illustrated with reference again to FIG. 4. The power amplifiers are configured in the velocity mode to take advantage of the velocity feedback. The power amplifier includes a voltage amplification stage which compares the applied voltage with the motor velocity and amplifies the difference before it is converted to a current and used to drive the DC servo motors.

The motion platform dynamic system response is a function of all the poles and zeros of the closed-loop transfer function. However, in most cases one can obtain a good approximation of the response by looking only at the dominant pair of poles which can be real or complex. In this case, the motion platform has two dominant poles. The first dominant pole is the result of a first order position loop response of approximately 1 Hz. The second dominant pole is the result of the first order tachometer loop response of approximately 30 to 100 Hz. The introduction of tachometer gain ($K_v$) adds a zero to the open loop transfer function. This configuration is more stable and can accommodate higher gains. For high frequency data, such as the accelerometer data from the live vehicle, the first order position loop response of the motion platform can be approximated as a first order integrator. The effects of this approximation will be discussed in more detail in the following section.

To command the motion platform 100 to a desired position, in either pitch 104 or roll 106 movement, both motors 114 must be controlled simultaneously using predefined motion control profiles. The motion control profiles are obtained from pre-processed motion data representative of both pitch and roll. The motion data is recorded during live video taping on two of the four available BetaCam audio channels, to as earlier described. In this manner, the motion data is synchronized to the video on a frame-by-frame basis.

A platform servo-controller 108, illustrated with reference again to FIG. 4, for the motion platform 100 has two analog inputs which accept voltages from −10V to +10V. These voltages represent the range through which each of the two motors can move. These voltages are represented in digital form to the digital-to-analog converters as a number between 0 and 4095, where 2048 is the normalized level position of the platform.

In one preferred embodiment of the present invention, the platform 100 is attached to a base 128 at three points, as illustrated with reference again to FIGS. 2A–2C. The front 130 of the platform 100 is supported by a universal joint 132 carried on a post 134 which is centered left to right. The rear 136 of the platform 100 is supported on each side by an actuator arm 138 linking the motor 114 directly to the motion platform 100. As illustrated in FIG. 2B, the two servo motors 114 push on the actuator arms 138 which raise and lower the sides of the platform 100 at the motor connection points. The platform 100 pivots on the universal joint 132. Together, these three points provide movement to the platform 100. By raising and lowering the motor connection points together, the platform can be pitched 104. By raising and lowering the motor connection points differentially, the platform can be rolled 106.

Thus, a degree of roll is determined from the difference between a left motor position number and a right motor position number and multiplying by a roll factor correction number. A roll factor correction number incorporates the degrees-per-motor-unit and length of the corresponding moment arm. Pitch 104 can be determined from an average distance from a nominal level position of the platform 100 for the two motor-position-numbers and multiplying by a pitch factor (similar to roll factor).

The following relationships are used, by way of example, using 2048 as the normalized level position of the platform assuming the motor position numbers vary from 0 to 4095:

Difference=left-motor number−right-motor number

Average=(left-motor number+right-motor number)/2

Pitch=pitch factor*(2048−average)

Roll=roll factor*difference

From these relationships, a left-motor number and right-motor number are determined when given the pitch and roll motion data as recorded from the live vehicle. With a result that:

right motor number=(((4096−(2*pitch/pitch factor))−(roll/roll factor))/2)

left motor number=((roll/roll factor)+right-motor number)

Pitch and roll motion data are read off-line from the scenario position control file (*.PSN). This file contains digitized motor position data for both pitch and roll. The *.PSN file is read into system memory when a scenario is loaded and is used to directly control the motion platform based on the above relationships.

The-system computer 400 directly interfaces to the electric motion platform 100 via an Industrial Computer Source PC-30D 12-bit digital to analog (D/A) converter board 404, earlier described with reference to FIG. 4, which D/A board outputs+/−10 vdc directly to the electric motion platform analog amplifiers, which in turn control the DC servo motors to position the platform to the correct position on a frame-by-frame basis. The pitch and roll motor values, read from the *.PSN scenario control files, are then written once per video frame to two D/A converters during a scenario. The D/A converter outputs are connected to the servo-controller amplifier inputs on the motion platform through a passive one hertz low pass filter to complete the reconstruction of the analog signal.

As earlier discussed, to provide the gunner 12 with realistic sensory motion cues during an engagement training exercise, the motion of the training platform should be synchronized to that of the video during scenario viewing. In other words, the motion system should provide motion amplitudes consistent with the visual image while also providing dynamic responses consistent with the live vehicle motion. Restoring motions, commonly referred to as wash-out in flight simulators, do not have to be accounted for in the system 10, herein described, since the motion platform provides for full range of motion in both pitch 104 and roll 106 for the scenarios presented.

A method is disclosed which measures and records both the pitch and roll motion data of a live vehicle during the scenario video tape recording, such that the live vehicle motion data could be synchronized directly to the video recording. In this manner, the live vehicle motion data is automatically synchronized to the motion platform movements during the scenario video playback.

As earlier discussed for one embodiment, herein described by way of example, tracking includes the use of an infrared spot tracker (IST), a 12-bit A/D interface board, a collimated high-power infrared emitting diode, and a weapon controller interface box. The tracker 312 provides the system computer 400 with high resolution X and Y position coordinates of an infrared spot projected on the video projection screen 202. The infrared spot 310 is projected on the video projection screen 202 by the collimated infrared emitting diode, the light source 306 located on the end of the barrel of a M2 0.50 caliber weapon 300, as illustrated with reference again to FIG. 3. Knowing the precise location of the collimated IR image spot 310 relative to the weapon sights, the computer 400 calculates the precise hit/miss data as well as continuously records and monitors tracking data relative to the center of mass of each target.

In a preferred embodiment, the infrared spot tracker 312 is physically located on top of the video projector 204, as illustrated with reference again to FIGS. 1 and 5. An f/1 lens, with a 52 degree field of view, images the 120-inch diagonal video projection screen back onto the trackers position sensing detector (PSD). The infrared spot 310 projected on the video projection screen 202 is imaged from the projection screen to the infrared spot tracker 312 PSD by the f/1 IST imaging lens. Two low-noise signal processing boards carried by the tracker 312 convert four low-level modulated analog currents generated from the infrared spot focused on the PSD into four high-level (0 to 10 volts) analog output voltages. For optimal tracking conditions, the IR energy collimated onto the screen should be maximized for intensity and uniformity while minimizing the IR spot diameter. A high-power OD-50L GaAlAs IRED (Opto Diode Corp, 1992) with a built-in collimating lens is used for the light source 306. The IRED is capable of emitting over 800 mw of infrared energy for a maximum input current pulse of 10 A. A built-in lens gives a half intensity, solid beam angle radiation pattern of twenty degrees with an effective source diameter $d_S$ of 0.250 inches. Further collimation by an external collimating lens, fabricated by Computer Optics, reduces the solid angle radiation pattern to approximately 1.5 degrees. The peak emission wavelength of the selected IRED is 880 nanometers, corresponding to the peak responsivity of the IST position sensing silicon detector.

The high-speed, 12-bit analog-to-digital converter board 412, earlier described with reference to FIG. 4, converts the four analog output position voltages from the tracker 312 to four digital signals. The tracker computer then performs simple calculations to determine the X-position and Y-position coordinates of the IR spot 310 based on the following relationships, wherein the low-noise analog output voltages from the tracker are used to calculate the incident spot position relative to the PSD surface according to the following equations:

For the X position coordinate, $$X_{pos} = \frac{V_{x1} - V_{x2}}{V_{x1} + V_{x2}}$$

and for the Y position coordinate, $$Y_{pos} = \frac{V_{y1} - V_{y2}}{V_{y1} + V_{y2}}$$

where $V_{x1}$, $V_{x2}$, $V_{y1}$, and $V_{y2}$ are the analog output voltages representing the photocurrent magnitude information from the PSD.

A software algorithm, using high-speed statistical averaging and position probability, is executed over a number of samples to reduce noise and further increase the effective resolution. For accurate weapon tracking and trigger-pull synchronization, the final position coordinates of the weapon are updated at 30 Hz with a radial standard deviation (RSD) error of approximately 150 microradians ($\mu$rad).

By interfacing with the weapon 300, weapon status is monitored and control of the light source 306, the high powered infrared emitting diode, is made. It is recommended that the high power IRED selected as the infrared energy source have an adequate heat sink and operate in a pulsed-mode manner to realize the high output power specified without catastrophic failure due to overheating. Pulsing the IRED also allows for selective filtering to increase the signal-to-noise ratio of the IST. The input current to the IRED must be modulated and have a low duty cycle as specified by the manufacturer for maximum output power. The infrared modulator and driver circuit are contained in the weapon controller interface box.

Ballistic corrections are also accounted for in a preferred embodiment of the invention. By way of summary, ballistics is the branch of physical science that deals with freely falling projectiles, their propulsion, motion, and terminal effects. The study of ballistics is generally broken down into interior ballistics, exterior ballistics, and terminal ballistics. Interior ballistics considers the time from the initial projectile propulsion until the projectile leaves the gun barrel. Exterior ballistics considers the time from when the projectile leaves the gun barrel until it reaches its final destination. Terminal ballistics is concerned with the effects of the projectile at or near impact.

The ballistics equations and subsequent flight path of the M2 0.50 caliber projectile, considered for the system 10, herein described by way of example, are a result of considering the effects of exterior ballistics only. The effects of the interior ballistics were considered constant and assumed to have no appreciable effect on weapon performance. However, it should be noted that significant heat build-up can occur within the gun barrel during prolonged firing which can in fact change the performance characteristics of the weapon. For this reason, the live-fire operation of the gun in a continuous mode is strongly discouraged and is assumed not to be a problem. The effects of terminal ballistics, although important for weapon design and effectiveness, are considered only as simple variables represented by a hit, miss, or angular error relative to the intended target.

The principal determinant of the flight path of the weapon projectile is based on the initial angle of elevation of the weapon relative to the horizon. However, before discussing how we determine the initial angle of elevation of the gun and the final impact position, it is necessary to review how the video footage is prepared for use in the system scenarios to allow for a complete ballistic solution. Each video scenario is completely defined by a series of seven scenario control files, five of which are directly related to the weapon ballistics. Scenario control files are used by the system computer to manage the video scenarios. In addition, the scenario control files allow the system computer to correlate two dimensional weapon aim point positions to the video scenarios to determine hits, misses, and the locations of various special effects such as explosions, tracers, and round impacts.

Clip Files. Each video frame is outlined on a frame by frame basis, as described in the Scenario Control Files section of this report. For each video scenario, the start and stop frames are identified. In addition, each target within a given scenario is also outlined for each frame of video. The outlining task consists of fitting a graphical polygon shape around each target for each frame of video. The start and stop frame along with the target outline data is stored in a file with a .CLP extension to indicate clip file.

Horizon Files. Since the ultimate goal is to measure the gun angle of elevation relative to the horizon, the location of the horizon for each frame of video must be properly identified within the video scenario. If the video is taken from a fixed nonmoving mount (i.e.: a tripod sitting on solid ground), the horizon need only be marked in one frame. If the camera is moving, as in the more general case, the horizon reference point must be marked in each frame. This data is stored in a file with a .HRZ extension to indicate horizon file.

Terrain Files. During the live video taping of the training scenarios, it is virtually impossible to keep the camera completely stable. If any camera motion is present during the scenario video taping relative to the target motion, it is necessary to compensate for this when drawing special effects such as water and land impact effects, tracers, and falling projectiles. Failure to account for the video motion will cause the special effects to move about the video since there is no correlation between the video and the special effects which come from the graphics overlay board. To correct this problem, a method was developed in which we could correlate the video motion to the location of the graphical special effects. An easily identifiable distant terrain feature is marked in each frame as a constant reference within the video scenario. This reference point indicates the direction and magnitude of the video shift as a result of any camera motion. The constant reference data is stored in a file with a .TRN extension. The .TRN data is used to shift the graphical special effects in synchronization with that of the video shift such that the net result is that the video and the special effects stay constant with respect to one another.

Background Files. The background files contain outline information for each frame of video identifying background areas where special effects are allowed to be drawn. For example, if a special effect such as a water splash occurs on land, the effect would not be drawn since it does not make sense to draw a water splash effect on land. This data is stored in a file with a .BGD extension.

Shoot Back Files. If shoot back effects are desired (i.e.: the muzzle flash of a weapon firing at the trainee), the starting frame and location within that frame are marked along with the type of effect (machine gun, etc.). This data is stored in a file with a .SB extension to indicate shoot back file.

As above described, the system 10 uses the two-dimensional video projection screen 202 to display scenarios to the gunner 12, which screen presents a window, from the gunner's viewpoint, into the real world. However, the video scenarios are displayed with only two dimensions of information, azimuth and elevation. There is no direct range information contained within the video image as it is presented to the gunner. Range information is provided to accurately fly the weapon projectile into the scenario. Using simple geometry, range at any given point within the two-dimensional video may be indirectly calculated based on the geometric relationships between the video horizon, the weapon platform, and the weapon sight line.

Figure 10:
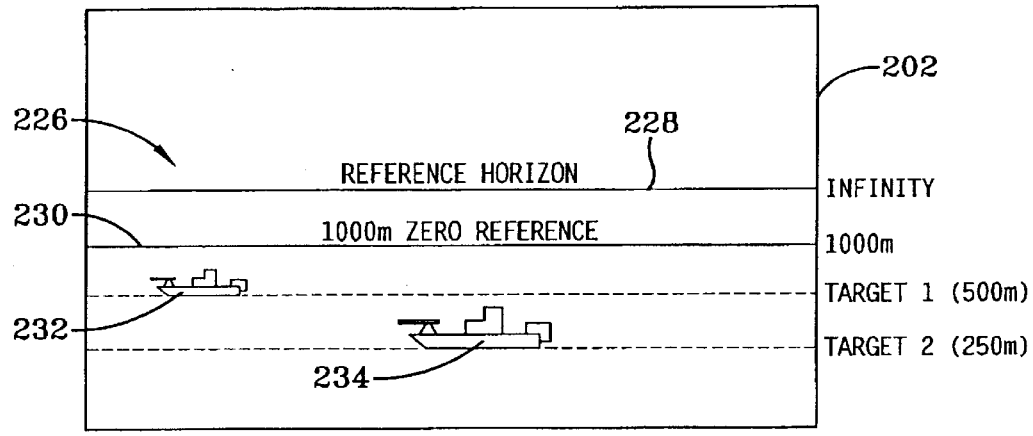
FIG. 10 is a partial diagrammatical view of a video projection screen image.

As illustrated with reference to FIG. 10, the video projection screen 202 includes an image 226 having an imaginary defined reference horizon 228, a 1000 meter zero reference line 230, and two targets 232, 234 at different ranges, by way of example. As one moves down from the reference horizon 228, to view the targets 232, 234, the range into the scenario decreases. If the gunner's eye point is assumed to be at the horizon 228 as illustrated with reference to FIG. 11, the gunner 12 would have to depress the line-of-sight 236 by an angle of θ degrees to view the target 232 at some angle below the horizon. In other words, there is a direct correlation between the range 238 into the scenario and the angle of depression 240 of the gunners eye point from the reference horizon 228.

Figure 11:
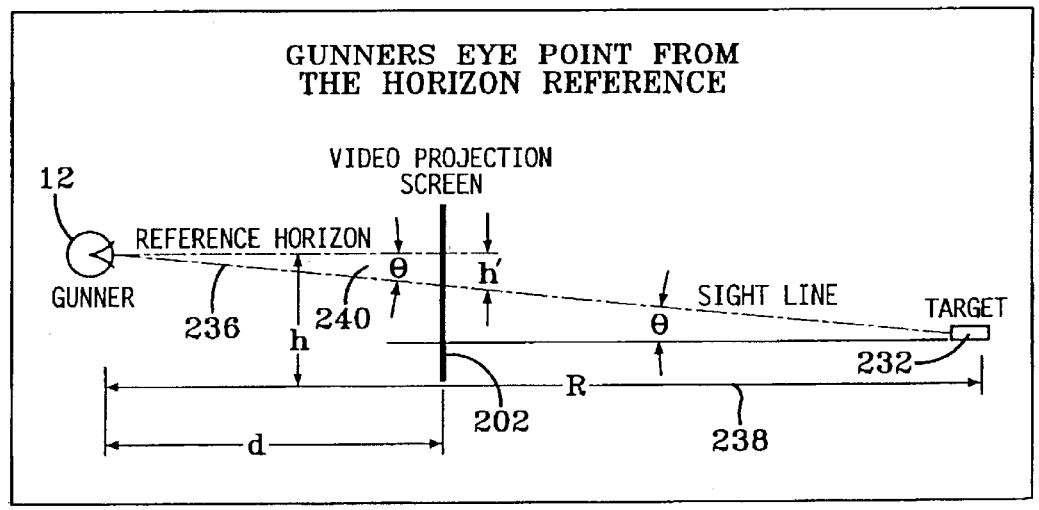
FIG. 11 is a diagrammatical view of one system geometry.

From FIG. 11, the following equations can be used to determine range (R) as a function of the angle of depression (θ):

$\theta = \tan^{-1}(h/R)$
$h' = d*(\tan \theta)$
and $R = d*(h/h')$
where,
h=height of eye-point above ground
h'=distance sight line is below horizon at screen
d=distance to screen from eye point
θ=angle of depression
R=range to the target Each pixel location below the horizon represents an incremental angle of depression which can now be determined from the above. As the angle of depression 240 increases, h' increases and the apparent range decreases. Once h' is known, the range to the aim point is calculated based on equation 11. Since the bore line of the weapon is offset from the sight line by a constant angle, the elevation of the bore line can easily be calculated by reading the position of the sight line from the infrared spot tracker.

The exterior ballistic equations used in the embodiment herein described were derived from a ballistic modeling software program, GTRAJ3 (GTRAJ3, 1992). The GTRAJ3 ballistics program calculates the time of flight, maximum ordinate, and angle of elevation for a given final impact range. The exterior ballistic model data is based on the effects of the projectile's physical properties such as exit velocity, projectile shape, projectile weight, gravity, aerodynamic retardation, and the Coriolis effect. Other factors, such as wind, temperature, humidity, and altitude, can all be varied but are assumed to be constant for the MWEPS device.

The GTRAJ3 program was used to generate a series of ballistic data points for terminal ranges from 100 meters to 3000 meters, at constant intervals of 100 meters. These data points are subsequently curve fitted to $6^{th}$ order polynomial equations for each range interval resulting in thirty sets of polynomial coefficients. A look-up table, stored in computer memory, is used to store the polynomial coefficients. The gun angle of elevation referenced to the horizon, is read from the infrared spot tracker and used as a pointer into the look-up table to select the appropriate coefficients.

The principle determinate of the flight path of the projectile as seen by the gunner, is based on the angle of the gun relative to the horizon when the round is fired. This angle is referred to as the angle of elevation and is dependent on both the gun position and the position of the motion platform just as it would be in the real world. In other words, the gun barrel could be level relative to the motion platform, but because the motion platform is pitched back two degrees, the net effect is that the gun position is elevated by two degrees. Therefore, the flight path is now based on a two degree angle of elevation. Given an angle of elevation for the weapon 300 relative to the reference horizon 228, fly-out ballistic data for the weapon desired is calculated in real time based on a series of $6^{th}$ order polynomial equations describing final range, time of flight, and projectile drop as a function of time.

When a scenario is running, a Control Code within the computer runs a continuous loop and processes gun events as they occur. First, the current position of the gun aim point is read from the infrared spot tracker to determine angle of elevation relative to the defined horizon reference point. Next, the current frame number of the video disc is calculated based on the fact that there are 30 frames of video each second of elapsed time. A precision clock is used to calculate the elapsed time since the last pass through the loop. If the weapon/gun status register shows a trigger pull, a shot fired event is generated and the angle of the weapon is calculated from the infrared spot tracker data providing the following conditions are met: 1) gun magazine is not empty, and 2) enough time has elapsed since the last shot. In addition, if the previous conditions are met, a digital output signal is sent to the recoil controller to cause gun recoil and the MIDI sound player is instructed to play a gunshot. A look-up table is utilized to find the closest matching ballistic curve based on the gun angle of elevation. The projectile range and time-of-flight to impact are calculated based on a series of $6^{th}$ order polynomial equations using coefficients directly from the look-up table. The number of rounds in the magazine is decremented and the round number is checked to see if this round should be a tracer. If the round is determined to be a tracer, a tracer event is generated. Using a time-of-flight equation, the video frame at which impact occurs is precalculated. This is the frame of video in which the round will impact the ground (or water) if it does not hit a target first. During the active scenario, each target that is defined and outlined in the .CLP file in the frame of impact is tested for a hit or miss. The range to the target is compared to the range-to-impact of the projectile. If the target is within range of the projectile, an intersection test is done to see if the flight path of the round passed through the target. The ballistic drop at target range is calculated. Then the shift between video frames caused by camera motion during taping is calculated. These values are added to the aim point, which is then tested against the stored target outline for the frame of impact. If the round is inside any of the hit polygons, a hit event is generated. Otherwise, a miss event is generated. All relevant data for the round is placed in the shot buffer and the round is marked as active. The current frame number is checked against the sound effects buffer and the shoot-back buffer. If a sound effect is scheduled for this frame (i.e., voice command), a sound event is generated. If a shot is scheduled in the shoot-back buffer, both a sound event and a graphics event are generated. Next, the frame number is tested to see if this is the first pass through the loop for this frame. If it is a new frame then the on-screen graphic are updated and new platform values are sent to the D/A board that controls the platform position.

The M2 0.50 caliber machine gun is generally loaded with a tracer round every fifth round. The tracer rounds are used by the gunner to visually observe the flight-path of the 0.50 cal projectile during enemy engagement. In this manner, the gunner can make aiming adjustment as he is shooting the gun. However, the tracer does not become visible until approximately 200 meters and then begins to burn out and become too small to see at approximately 1000 meters. Tracers are simulated by generating special graphic tracer effects that are overlaid on top of the video in real time. Tracers are marked in the shot buffer so that the graphics overlay board knows when to draw the tracer effect. The active rounds in the shot buffer are processed once per frame of video. If a round is marked as a tracer round, and if the tracer is in the visible range (200 m to 1000 m), it is drawn to the video projection screen. The effect of the tracers becoming dimmer and smaller in size as they fly out are accounted for in the simulation. However, there are limitations to how well one can simulate the tracers due to the limitations of the graphics boards available and the video projector system selected. By way of example, the video graphics overlay board 406, earlier described with reference to FIG. 5, may be limited to a resolution of 640 by 480 pixels, limiting the range of size for small graphic images, such as tracer effects, to the video projection screen. Also, the video projection system output light level for small graphic effects may be less than what is seen for live tracers. Therefore, the on-screen tracers do not appear bright as tracers do in the real world. Adjustments are made to both tracer color and size to make the tracers more visible without sacrificing realism. Tracers are drawn as dots which dim and grow smaller as they fly out. Tracers are only drawn when the round is within the 200 m to 1000 m range band in which they should be visible. Tracers are also shifted each frame to remain properly aligned relative to the background.

Once an active round in the shot buffer reaches its frame of impact or hits a target, it is marked inactive and an entry is made in the special effects buffer. The effects buffer is processed once per frame. The duration of the effect is stored in the buffer. If an effect is active (i.e., it has a duration greater than zero), it is drawn to the screen and the duration is decremented by one frametime. If a target is hit five or more times, it is marked as destroyed.

Weapon effects such as projectiles in flight, tracers in flight, ground impacts, water impacts, and explosions are all processed by a graphics overlay board which generates and overlays the graphic effects on top of the video presented to the gunner.

Miss effects are tested against the video background outline to see if they should be visible or non-visible. If the effect is marked as visible, then the miss effect is drawn frame by frame for the entire duration of the effect. Miss effects must be shifted each video frame to account for any camera motion during taping. This guarantees that the miss effect is constant relative to the background.

Hit effects and target-destroyed effects are drawn at the centroid of the target's hit outline. Hit effects and target-destroyed effects naturally follow the target on a frame by frame basis because they are drawn at the centroid of the target outline. Target-destroyed effects are drawn using a different method. Because they are on screen for long periods of time as compared to other effects, the flames of the target-destroyed effect need to look more natural. A series of bit map images simulating flickering flames are stored off-screen in video memory and copied as an array of pixels onto the screen at the appropriate location. There is an initial sequence of an explosion that is drawn only once for each destroyed target and a repeating sequence of flames. This gives the appearance of an explosion and a flame flickering on the target.

An alignment procedure is implemented to minimize errors due to geometry, linearity, and sight picture variations. In addition, the alignment procedure is required to map the video image to the infrared spot tracker coordinate system. The MWEPS alignment procedure consists of a mechanical alignment, an electronic calibration, and a weapon zero procedure. When the system is first set up, the infrared spot tracker 312 is mechanically aligned to the video projection screen 202. A software alignment program draws a large cross-hair centered on the video projection screen. This program is first used to adjust the projector to put the picture in the center of the screen. Then, using an infrared viewer, the weapon is positioned so that the collimated spot from the weapon is centered on the cross-hair. The alignment program continuously prints out the X and Y position coordinates it is reading from the tracker with the center of the cross-hair being the origin. The tracker is then mechanically adjusted to null out the reading as close to zero as possible.

Once the system 10 is mechanically aligned, an electronic calibration is performed to map the infrared spot tracker to the video projection screen and to compensate for any nonlinearities from the video projection system. Calibration marks are drawn sequentially left, right, above, and below the center of the projection screen. As each mark is drawn, the operator aligns the weapon sights to each calibration mark and pulls the trigger. When all of data points have been generated, an electronic zero is performed by the system computer.

A user zero routine is available to zero the weapon to each individual's sight pictures at a range of 1000 meters. The gunner fires three rounds at a 1000 m target. The computer calculates the centroid of the shot group and shifts all subsequent shots by the appropriate x and y offsets. The user zero routine is the electronic equivalent of a mechanical live fire zeroing procedure.

System computer software included three functional layers for an instructor interface (II), hardware interface (HI), and the real-time control code (CC). The II software consists of menus which allow the instructor to control the operating conditions of the system 10 (e.g., recoil, ammunition, motion, etc.), select the training scenario to be run, provide feedback, and calibrate the system. The HI software is a set of software routines to provide an interface layer between the system hardware and the rest of the software. The CC software contains the logic to run the selected scenario, collect real-time data, manage the hardware, provide feedback, etc. Utility programs are provided to test and calibrate the hardware and to prepare new scenarios.

The software uses the C programming language running under MS-DOS, 32 bit protected mode. A modular software design separates each functional program component into small modules. Each module was compiled with the Watcom C/C++9.5 32 bit Compiler. Linking was done with the PharLap Linker Ver 6 to create a protected mode 32 bit DOS program. Commercially available software packages were used. By way of example, Matrox provided linkable C compatible libraries to interface to the Matrox MGA Impression and Matrox Marvel boards. Datel provided C source code to facilitate the interface with the PC-415 A/D board. Computer Boards provided C source code to interface to the PC-30 D/A board.

Each software layer (II, HI, and CC) is further broken down into multiple functional modules. Each module, as much as possible, performs a single task. Some modules are designed to be used by more than one program. These modules perform common functions such as interfacing to the hardware and providing instructor interface functions such as menu control and file I/O.

Four major software programs were developed and compiled to run the system computer, which included:
PLATFORM.EXE: This is the run-time program to control the scenario presentation, motion platform, and weapon tracking functions.
TEST.EXE: This program tests and calibrates the hardware.
MAPMENU.EXE: This is an off-line utility program for preparing the video scenarios for playback.
PLOTGRAPH.EXE: This program is used to provide the graphic scenarios.

The II software provides five information windows on the operator console. A window located in the middle of the screen displays menus and other information as needed. A top window, one line stretching across the top of the screen, displays system information such as scenario name and data, etc. The left menu displays the state of various optional settings. The right menu displays feedback on the scenario progress such as number of rounds fired, number of rounds left in the magazine, and number of hits on each target. A bottom window prompts for input, provides error messages, etc. Interaction with the menus is through the use of the keyboard. The top level menu of the II software contains those commands needed to load, run, and replay a scenario. It also performs calls to submenus as needed. The first submenu contains functions needed to calibrate the tracker. The second submenu allows the instructor to change various optional parameters (e.g.: recoil ON/OFF, motion ON/OFF, etc.)

The HI software consists of several modules containing routines that turn the interface between the hardware and the rest of the software into a set of subroutine calls. Some of these modules utilize calls from libraries supplied by the hardware vendors. The video/graphics subsystem consists of the Matrox MGA Illuminator graphics board and the Matrox Marvel video-graphics overlay board. Several modules provide high level calls to initialize these boards, to turn video on/off, and to draw graphical overlay effects to the screen. Additional software modules are used to interface with the Analog and Digital I/O boards. These consist of the PC-30 board which provides the system clock, D/A outputs, and Digital I/O; the PC-415 board which provides the analog inputs to read the tracker data; and the MIDI interface board which provides a MIDI port to talk to the digital sample player.

Figure 12:
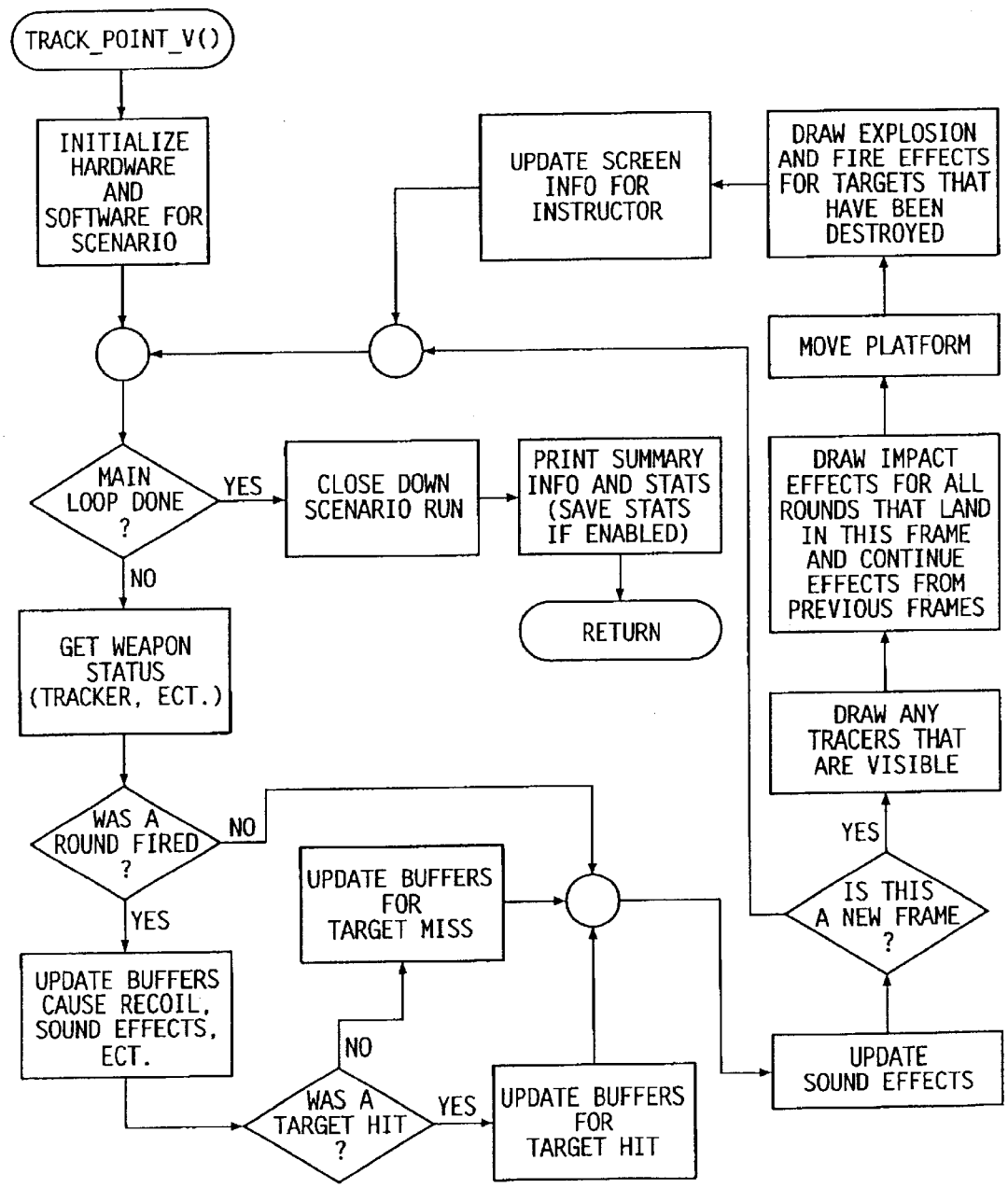
FIG. 12 is a block diagram illustrating flow for a control code software useful in the simulation system of FIG. 4.

The CC software has two major parts. The scenario CC and the playback CC. A high level flow diagram of the control code software is illustrated with reference to FIG. 12. Note that the entry point to the track_point_c( ), not shown in FIG. 12, is in the main program loop. The scenario CC interfaces directly to the video disk player to play the appropriate scenario video segment. The scenario CC also continuously reads the tracker data and stores the data for playback and off-line analysis. If the weapon trigger is pulled, the scenario CC will determine if a shot should be fired based on ammunition availability and the cyclic rate of the weapon. If a shot is fired, the scenario CC calculates the flight path of the round, determines if it hit anything, and provides the appropriate feedback (gunshot sound, tracer on screen, impact effects, etc.). The playback CC provides feedback to the instructor via the Instructor Interface. Feedback data includes the number of rounds fired, the number of hits, percent hits, tracking data, ammunition cost, etc. If file storage is turned on, various real time performance data are stored to the appropriate file for subsequent analysis.

The control code functions and CC software routine continuously acquire the trainee's on-screen weapon aim point data and calculate the aim-point location relative to the scenario targets. An A/D adapter board is used to simultaneously sample the infrared spot trackers' analog output signals. The weapon's high powered IRED is activated for a period of approximately six milliseconds. During this time period, the analog tracker signals are sampled with a 12 bit 100 kHz analog to digital converter. Tracker data is processed by the system computer to accurately determine the subject's weapon aim-point.

The CC software continuously acquires and saves the subjects real time performance data. In particular, the MWEPS testbed continuously collects weapon aim-point location, weapon status (e.g., trigger) and time to engage targets.

A scenario summary is created during each scenario by measuring the total number of rounds fired, number of target hits, and relative tracking error. This information is displayed to the user after a scenario is complete.

A graphical replay of weapon aim point and shot statistics is available after a scenario is completed. The playback portion of the CC software plays back the video scenario in slow motion, while overlaying graphical icons over the video scenario representing the continuous weapon aim-tracking point and round impacts during the scenario.

The system software includes 21 modules plus several commercial libraries. The main modules are plafform.c, utils1.c, utils2.c, trackxy.c, timer.c, motor.c, zero.c, pc30.c, matrox.c, sxci.c, disc.c, serial.c, midi.c, file.c, getpix.c, pc415.c, eisa.c, scrn.c, hittest.c, marvel.c, and efx.c. The main modules are each described in greater detail below.

PLATFORM. module is the entry point to and from the MWEPS program. When the program is run, calls are made to initialize variables and set the initial state of the hardware. The user interface menus are also provided in this module. In addition, the main program loop, track_point_v, which runs the system when a scenario is operating, is contained within this module.

UTILS1.C module provides various subroutines called from the module plafform.c. These subroutines are also used by other programs.

UTILS2.C module provides various subroutines called from the module plafform.c. These subroutines are also used by other programs.

TRACKXY.C module provides the interface to the tracker. Because it is controlled through the same hardware, this module also provides the interface to the weapon.

TIMER.C module controls a high-speed hardware timer to provide an accurate real time system clock.

MOTOR.C module provides subroutines to drive the motor controller which positions the platform.

ZERO.C module provides the subroutine that electronically aligns the tracker with the screen and the IRED. It calculates the scale factors and offsets needed to correctly align the tracker with the picture on the screen.

PC30.C module provides the low level subroutines to talk to the PC-30 I/O board.

MATROX.C module provides some of the low-level and many of the mid level subroutines to control the Matrox graphics board.

SXCI.C module provides the rest of the low-level subroutines to control the Matrox graphics board.

DISC.C module provides the low-level subroutines to control the video disk player.

SERIAL.C module provides the low-level subroutines to use the serial ports. These routines bypass the BIOS and talk directly to the hardware.

MIDI.C module provides the subroutines to send MIDI commands and data to the Sample Player.

FILE.C module provides the subroutines for file I/O.

GETPIX.C module provides the subroutines to load graphic effects into the off-screen memory of the graphics board.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

That which is claimed is:

1. A method for training a gunner operating a weapon from a platform experiencing pitching and rolling movement, the method comprising the steps of:

placing the gunner on a platform, the gunner operating a demilitarized weapon therefrom;

attaching a light source on the weapon for emitting an infrared beam therefrom along a line-of sight of the gunner;

displaying a scene on a fixed screen for viewing by the gunner, wherein said scene is a prerecorded video image of landscape seen from a moving vehicle that simulates the terrain and targets viewed from the motorized military version of said demilitarized weapon;

placing the eye of the gunner at an elevation of a horizon in the scene;

locating a preselected target below the horizon within the scene;

imparting a pitching and rolling movement to the platform in response to a preselected motion profile synchronized with the scene, wherein said motion profile simultaneously was recorded with and corresponds to motion associated with said prerecorded video image;

aiming the weapon at the screen for placing an infrared spot thereon;

continuously tracking the infrared spot on the scene;

triggering the weapon for simulating a projectile emission from the weapon;

identifying a location of the spot for the triggering step;

making a ballistics correction for the simulated projectile, wherein the ballistics correction step comprises the steps of:

determining a range to the target based on an angle of depression from the line-of-sight from the eye of the gunner to the horizon and a known fixed distance between the gunner and screen, and modifying the spot location identified for the triggering step based on a ballistic model consisting of factors selected from the group including exit velocity, projectile shape, projectile weight, gravity, aerodynamic retardation, and Coriolis effect; and determining a gunner performance based on the spot identifying step and the location of the preselected target.

2. The method according to claim 1, wherein the spot location modifying step further includes modifying based on factors selected form the group consisting of wind, temperature, humidity, and altitude.

* * * * *